(12) United States Patent
Watanabe et al.

(10) Patent No.: US 7,976,097 B2
(45) Date of Patent: Jul. 12, 2011

(54) COWL STRUCTURE OF VEHICLE

(75) Inventors: Kenji Watanabe, Atsugi (JP); Hidekazu Saitou, Hiratsuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 194 days.

(21) Appl. No.: 12/277,628

(22) Filed: Nov. 25, 2008

(65) Prior Publication Data

US 2009/0146459 A1 Jun. 11, 2009

(30) Foreign Application Priority Data

Dec. 7, 2007 (JP) ................................. 2007-316969

(51) Int. Cl.
*B60H 1/28* (2006.01)

(52) U.S. Cl. ........................................................ 296/192
(58) Field of Classification Search .................... 296/70, 296/96.21, 190.1, 192, 201, 208
See application file for complete search history.

(56) References Cited

U.S. PATENT DOCUMENTS

| | | | |
|---|---|---|---|
| 4,679,845 A | | 7/1987 | Detampel et al. |
| 4,819,550 A | * | 4/1989 | Ioka ................. 454/147 |
| 6,322,440 B1 | * | 11/2001 | Nakatani ............... 454/147 |
| 2003/0107243 A1 | * | 6/2003 | Hayashi ................ 296/192 |

FOREIGN PATENT DOCUMENTS

| | | | | |
|---|---|---|---|---|
| DE | 10351641 B3 | * | 2/2005 | |
| EP | 99115 A2 | * | 1/1984 | |
| JP | 57007767 A | * | 1/1982 | |
| JP | 61075065 A | * | 4/1986 | |
| JP | 04031122 A | * | 2/1992 | |
| JP | 04038278 A | * | 2/1992 | |
| JP | 05-069858 A | | 3/1993 | |
| JP | 6-278655 A | | 10/1994 | |
| JP | 2004058722 A | * | 2/2004 | |
| JP | 2008-074202 A | | 4/2008 | |

* cited by examiner

*Primary Examiner* — Glenn Dayoan
*Assistant Examiner* — Paul A Chenevert
(74) *Attorney, Agent, or Firm* — Foley & Lardner LLP

(57) ABSTRACT

A cowl structure including a cowl box having a partition panel joined to both rear and bottom walls thereof inside the cowl box. The partition panel constitutes, together with the rear and bottom walls, a hollow member portion extending in a vehicle width direction. An outside air introducing port is provided in the cowl box, for introducing outside air into the cowl box outside of the member portion. A communication port is provided in the partition panel, for allowing the inside and outside of the member portion to communicate with each other inside the cowl box. An air supplying port is provided in the rear wall at a location spaced upward from the bottom wall, for allowing the inside of the member portion and a vehicle compartment to communicate with each other. The communication port and the air supplying port overlap each other in the vehicle width direction.

3 Claims, 3 Drawing Sheets

US 7,976,097 B2

COWL STRUCTURE OF VEHICLE

The present disclosure relates to subject matters contained in Japanese Patent Application No. 2007-316969, filed on Dec. 7, 2007, the disclosures of which is expressly incorporated herein by reference in its entirety.

BACKGROUND OF THE INVENTION

1. Field of the Invention

The present invention relates to a cowl structure of a vehicle such as an automobile.

2. Description of the Related Art

Some vehicles include a pair of right and left hood ridge members which are respectively provided to right and left side walls of an engine room, and a cowl box which is provided to a rear wall of the engine room and extends in the vehicle width direction to connect the rear end portions of the respective hood ridge members to each other.

Japanese Patent Application Publication No. Hei. 5-69858 discloses a structure of a vehicle body for supplying outside air to the inside of the vehicle compartment. An outside air introducing port is provided to the front end portion of at least one of the hood ridge members. The hood ridge members are connected to both end portions of the cowl box in the vehicle width direction. An air supplying port is provided to the rear wall of the cowl box and communicates with the inside of the vehicle compartment. In this structure, the outside air is introduced from the outside air introducing port into the inside of the hood ridge member, and then is supplied through the inside of the cowl box to the vehicle compartment via the air supplying port.

SUMMARY OF THE INVENTION

In the above-described cowl structure, when water such as rainwater enters the cowl box, the water temporarily remains inside the cowl box until being discharged from a drain provided in the cowl box.

When outside air is supplied to the vehicle compartment, air flows in the vehicle width direction inside the cowl box. Since the cowl box has a narrow shape elongated in the vehicle width direction, the airflow becomes so strong that the water remaining inside the cowl box is ruffled, resulting in that the water leaks from the air supplying port and enters the inside of the vehicle compartment.

An object of the present invention is to provide a vehicle cowl structure capable of preventing water leak from an air supplying port.

An aspect of the present invention is a cowl structure of a vehicle, comprising: a cowl box provided to a vehicle body and extended in a vehicle width direction, the cowl box including: a front wall; a rear wall opposed to the front wall in a vehicle front-rear direction; a bottom wall connecting the Front wall with the rear wall; and a support panel which extends Frontward from an upper end portion of the rear wall and which supports a lower edge portion of a front windshield panel; a partition panel joined to both the rear wall and the bottom wall inside the cowl box, the partition panel constituting, together with the rear wall and the bottom wall, a hollow member portion extending in the vehicle width direction; an outside air introducing port provided in the cowl box, for introducing air outside the vehicle body into the cowl box outside of the member portion; a communication port provided in the partition panel, for allowing an inside and outside of the member portion to communicate with each other inside the cowl box; and an air supplying port provided in the rear wall at a location spaced upward from the bottom wall, the air supplying port allowing the inside of the member portion and an inside of a vehicle compartment to communicate with each other, wherein the communication port and the air supplying port overlap each other in the vehicle width direction.

BRIEF DESCRIPTION OF THE DRAWINGS

The invention will now be described with reference to the accompanying drawings wherein.

DESCRIPTION OF THE PREFERRED EMBODIMENT

A preferred embodiment of the present invention will be described below with reference to the drawings. With regard to FIG. 1, in order to illustrate the interior of a cowl structure of a vehicle, a cowl box 10 is depicted with phantom lines and is partly omitted. Throughout FIGS. 1 to 3, reference letters FR, UP and LH denote frontward/forward, upward and leftward, respectively, with respect to the vehicle body.

Figure 1:
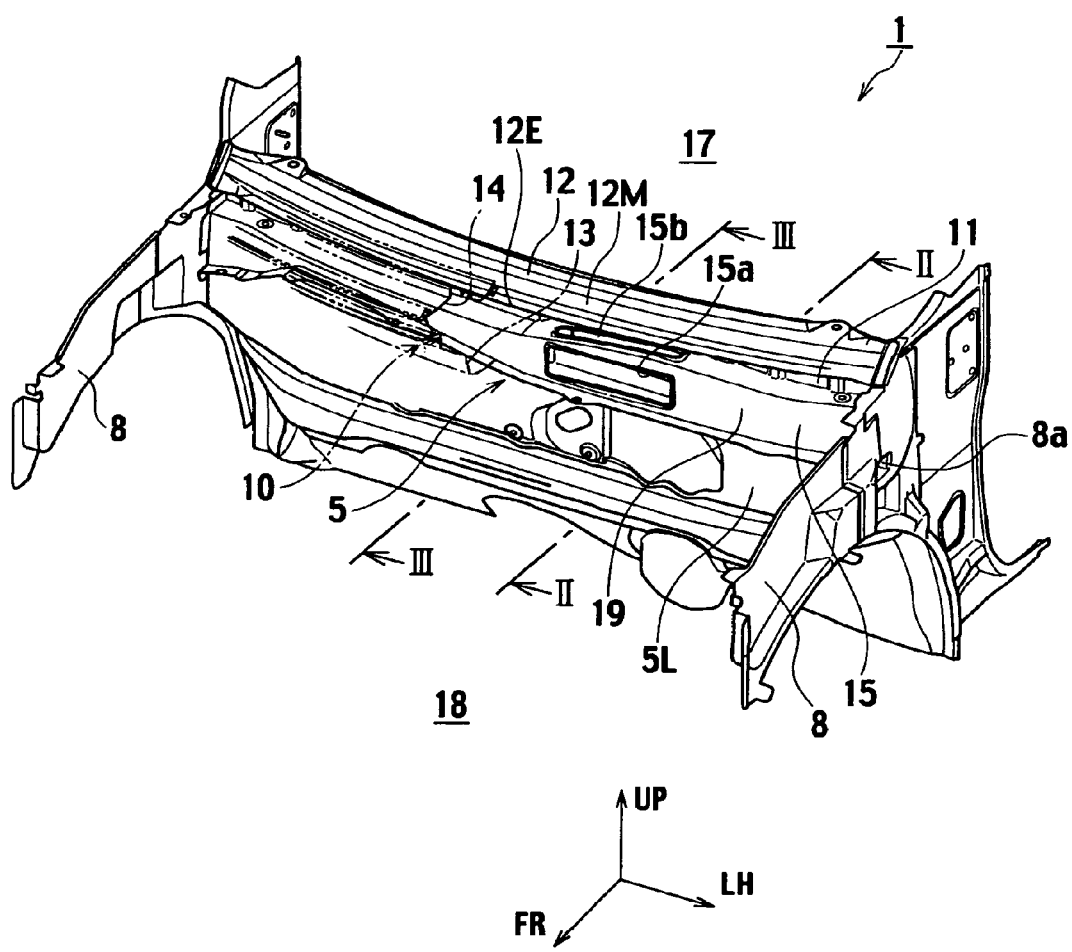
FIG. 1 is a perspective view showing a front part of a vehicle body including a cowl structure according to an embodiment of the present invention.
Figure 2:
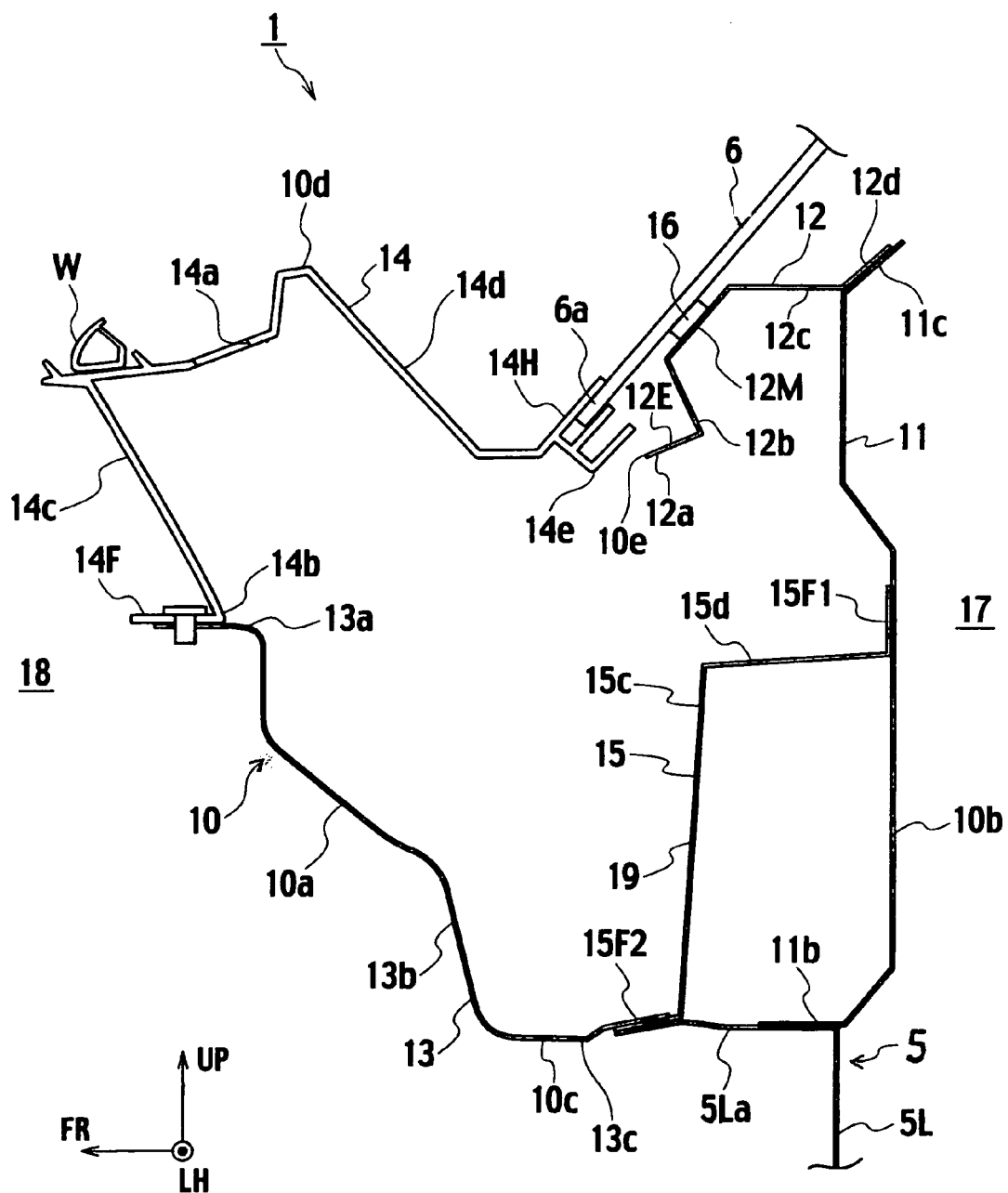
FIG. 2 is a magnified cross-sectional view of the cowl structure taken along the II-II line of FIG. 1.
Figure 3:
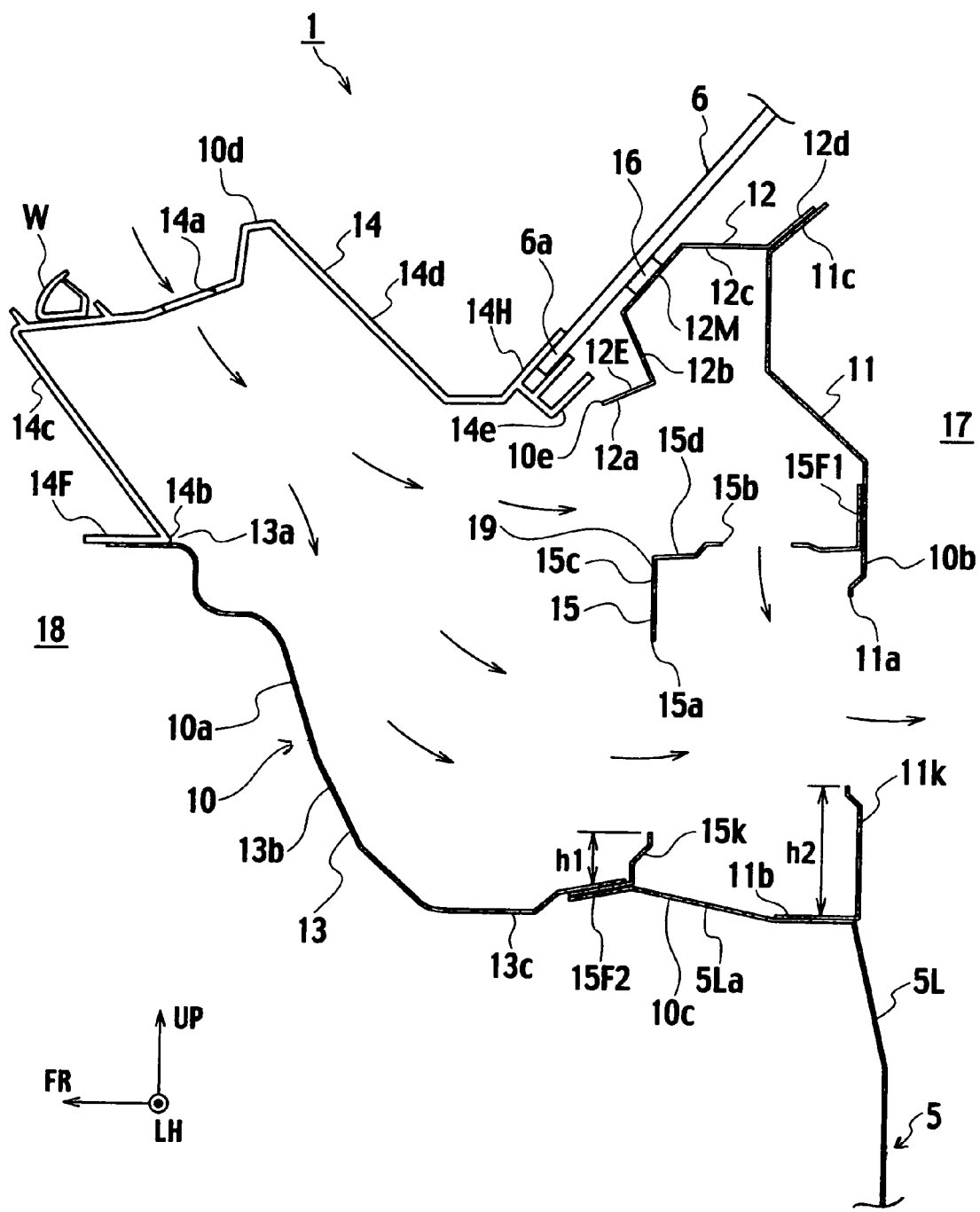
FIG. 3 is a magnified cross-sectional view of the cowl structure taken along the III-III line of FIG. 1.

As shown in FIGS. 1 to 3, in a vehicle body 1, a vehicle compartment 17 and an engine room 18 are separated from each other by a dash panel 5. The dash panel 5 is provided on an upper portion thereof with a cowl box 10 extending in the vehicle width direction. A partition panel 15 is provided inside the cowl box 10. The partition panel 15 partitions a part of the internal space of the cowl box 10.

The cowl box 10 has a narrow shape elongated in the vehicle width direction. The cowl box 10 supports substantially an entire lower edge portion extending in the vehicle width direction of a front windshield panel 6 (FIG. 2). Right and left dash side panels 8, as side panels of the vehicle body, are fixed respectively to the two end portions of the cowl box 10 in the vehicle width direction. The dash side panels 8 extend frontward from the respective two end portions of the cowl box 10, respectively. A hood ridge member (not illustrated) is attached to the outer side surface of the corresponding dash side panel 8.

As shown in FIGS. 2 and 3, the cowl box 10 includes an upper folded piece 5La, a dash upper panel 11, a support panel 12, a cowl lower panel 13 and a cowl upper panel 14. The upper folded piece 5La is formed in an upper end portion of a dash lower panel 5L, and substantially horizontally extends frontward from the upper end of the dash lower panel 5L.

The cowl box 10, in its cross section substantially perpendicular to the vehicle width direction, includes a front wall 10a, a rear wall 10b, a bottom wall 10c and an upper wall 10d. The front wall 10a is an inclined wall which constitutes a front side surface of the cowl box 10, and which extends obliquely upward and frontward. The rear wall 10b is a wall which is opposed to the front wall 10a in the vehicle front-rear direction, and which extends substantially vertically. The bottom wall 10c is a wall with which the lower end of the front wall 10a and the lower end of the rear wall 10b are connected to each other, and which extends in the substantially horizontal direction. The upper wall 10d is a wall with which the upper end of the front wall 10a and the upper end of the rear wall 10b are connected to each other, with the lower edge portion of the front windshield panel 6 being interposed in between, and which extends substantially in the horizontal direction. Together with the lower edge portion of the front windshield panel 6, the cowl box 10 constitutes a closed cross-section member which has a closed cross-section in a cross-section substantially perpendicular to the vehicle width direction.

The dash upper panel 11 has a lower folded piece 11*b* which substantially horizontally extends frontward from the lower end portion of the dash upper panel 11. The lower folded piece 11*b* of the dash upper panel 11 is connected to the upper folded piece 5L*a* of the dash lower panel 5L. This dash upper panel 11 constitutes the rear wall 10*b* of the cowl box 10.

The cowl lower panel 13 has a substantially L-shape in its cross section substantially perpendicular to the vehicle width direction. A rear end portion of a lower side portion 13*c* of the L-shaped cowl lower panel 13 is connected to the upper folded piece 5L*a* of the dash lower panel 5L. Together with the upper folded piece 5L*a*, the lower side portion 13*c* constitutes the bottom wall 10*c* of the cowl box 10. A vertical side portion 13*b* of the L-shaped cowl lower panel 13 extends from the front end of the lower side portion obliquely upward and frontward. The vertical side portion 13*b* is formed to have, at the upper end portion thereof, a front upper end portion 13*a* which substantially horizontally extends frontward from the upper end of the vertical side portion 13*b*.

The support panel 12, as a cantilevered panel, extends frontward from the upper end portion of the dash upper panel 11, in its cross section substantially perpendicular to the vehicle width direction. A front tip end portion 12*a* of the support panel 12 constitutes a free end. A rear end portion 12*d* of the support panel 12 is an inclined wall extending obliquely rearward and upward, and is joined to a flange 11*c* formed in the upper end portion of the dash upper panel 11. A horizontal portion 12*c* substantially horizontally extends frontward from a front end of the rear end portion 12*d*. From a front end of the horizontal portion 12*c*, a middle portion 12M extends obliquely frontward and downward substantially parallel to an inner surface of the front windshield panel 6. A front end side of the support panel 12 located in front of the middle portion 12M is an eaves portion 12E which bends downward once and then extends frontward. In other words, from the front end of the middle portion 12M, a vertical wall 12*b* extends obliquely rearward and downward. From a lower end of the vertical wall 12*b*, the eaves portion 12E extends obliquely frontward and downward. In the middle portion 12M, the support panel 12 supports the lower edge portion of the front windshield panel 6. The inner surface of the lower edge portion of the front windshield panel 6 is adhered to the upper surface of the middle portion 12M by an adhesive sealing member 16.

The cowl upper panel 14 connects the front upper end portion 13*a* of the cowl lower panel 13 to a lowermost edge 6*a* of the front windshield panel 6. The cowl upper panel 14 is formed of a hard synthetic resin.

The cowl upper panel 14, in its cross section substantially perpendicular to the vehicle width direction, includes: a vertical wall 14*c* extending obliquely frontward and upward from the upper end portion of the cowl lower panel 13; and a cover portion 14*d* extending rearward from an upper end of the vertical wall 14*c*. Together with the vertical side portion 13*b* of the cowl lower panel 13, the vertical wall 14*c* constitutes the front wall 10*a* of the cowl box 10.

An attachment flange 14F substantially horizontally extending frontward from the lower end of the vertical wall 14*c* is formed in a front lower end portion 14*b* of the cowl upper panel 14. The attachment flange 14F is fastened to the front upper end portion 13*a* of the cowl lower panel 13 by use of a fastener. A holding part 14H for holding the lowermost edge 6*a* of the front windshield panel 6 is formed in the rear end portion of the cowl upper panel 14, in other words, the rear end portion 14*e* of the cover portion 14*d*. The holding part 14H has a substantially U-shape in its cross section substantially perpendicular to the vehicle width direction. Specifically, a slot whose width is substantially equal to the thickness of the lowermost edge 6*a* of the front windshield panel 6 is formed in the holding part 14H. The holding part 14H supports the front windshield panel 6 with the lowermost edge 6*a* being inserted in the slot.

An upper rear end portion of the holding part 14H is situated near a tip end portion of the eaves portion 12E of the support panel 12, before, or forward in the vehicle front-rear direction of, and above the tip end portion of the eaves portion 12E. The rear end portion 14*e* of the cover portion 14*d* is spaced from the front end portion 12*a* of the support panel 12. A downward opening 10*e* of the upper wall 10*d* is formed between the rear end portion 14*e* of the cover portion 14*d* and the front end portion 12*a* of the support panel 12. The downward opening 10*e* is located frontward, or forward in the vehicle front-rear direction, of communication ports 15*a* and 15*b* provided in the partition panel 15. The communication ports 15*a* and 15*b* will be described later.

A weather strip W is provided on the top surface of the front end portion of the cover portion 14*d* in the present embodiment. This weather strip W is provided to ensure liquid-tightness between the cowl upper panel 14 and a hood panel whose illustration of the hood panel is omitted from the drawings.

The partition panel 15 extends in the vehicle width direction, and bridges between the right and left dash side panels 8. The two end portions of the partition panel 15 in the vehicle width direction are fixed respectively to the dash side panels 8 (FIG. 1). As shown in FIGS. 2 and 3, the partition panel 15 is arranged inside the cowl box 10, joined to both the rear wall 10*b* and the bottom wall 10*c* of the cowl box 10, so as to span between the rear wall 10*b* and the bottom wall 10*c*.

The partition panel 15 has a substantially reversed L-shape in its cross section substantially perpendicular to the vehicle width direction. The partition panel 15 has an upper wall 15*d* which extends substantially horizontally in an upper portion of the partition panel 15. The partition panel 15 has a front wall 15*c* which extends downward from the front end of the upper wall 15*d*, and which is substantially parallel to the rear wall 10*b* of the cowl box 10. The upper wall 15*d* is provided in the rear end portion thereof with a flange 15F1 which extends upward from the rear end of the upper wall 15*d*. The front wall 15*c* is provided in the lower end portion thereof with a flange 15F2 which extends frontward from the lower end of the front wall 15*c*. The flange 15F1 is spot-welded to the front side surface of the dash upper panel 11, at a substantially middle point/level between the flange 11*c* and the lower folded piece 11*b*. By spot-welding, the flange 15F2 connects both the rear end portion of the lower side portion 13*c* of the cowl lower panel 13 and the front end portion of the upper folded piece 5L*a* of the dash lower panel 5L while the flange 15F2 being held between the rear end portion of the lower side portion 13*c* and the front end portion of the upper folded piece 5L*a*. Specifically, together with the rear wall 10*b* and the bottom wall 10*c* of the cowl box 10, the partition panel 15 constitutes a hollow member portion 19 which extends in the vehicle width direction and has a substantially rectangular cross-section.

The member portion 19 communicates with the inside of the hood ridge members (not illustrated) attached to the respective outer side surfaces of the dash side panels 8. Specifically, as shown in FIG. 1, openings 8a are respectively formed in the dash side panels 8 at their portions connected with the member portion 19. Through each opening 8a, the inside of the member portion 19 communicates with the inside of each hood ridge member. The opening portions 8a have a substantially rectangular shape. The height of the lower edge of the opening 8a is designed to coincide with the height of the bottom surface of the member portion 19 (the bottom surface of the cowl box 10). When water such as rainwater is accumulated inside the member portion 19, the water is discharged from these openings 8a through the respective hood ridge members to the outside the vehicle.

In the present embodiment, for the purpose of supplying air outside the vehicle body 1 (hereinafter referred to as the "outside air") into the vehicle compartment 17, an outside air introducing port 14a is provided in the upper wall 10d of the cowl box 10, and the multiple communication ports 15a and 15b (two ports in the present embodiment) are provided in the partition panel 15, as well as an air supplying port 11a is provided in a rear wall 10b of the cowl box 10, which is opposed to the front wall 15c of the partition panel 15.

The outside air introducing port 14a is formed in a portion of the cover portion 14d of the cowl upper panel 14 constituting the upper wall 10d of the cowl box 10, the portion being covered with the rear edge portion of the hood panel while the hood panel is closed. The outside air introducing port 14a introduces the outside air into the space inside the cowl box 10 and outside of the member portion 10.

Inside the cowl box 10, the inside and outside of the member portion 19 communicate with the communication ports 15a and 15b. Such structure allows air outside the member portion 19 to be introduced into the inside of the member portion 19 through the communication ports 15a and 15b.

Out of the two communication ports 15a and 15b, one communication port 15a is a substantially rectangular opening elongated in the vehicle width direction, and is formed in the front wall 15c of the partition panel 15. The other communication port 15b is an opening elongated in the vehicle width direction, and is formed in the upper wall 15d. The communication port 15a is opposed to the air supplying port 11a in the vehicle front-rear direction. The communication port 15a and the air supplying port 11a are positioned in a way that their openings overlap each other, when the openings are viewed from the front of the vehicle. That is to say, projections of the two openings overlap each other if the communication port 15a and the air supplying port 11a are projected onto a plane perpendicular to the vehicle front-rear direction. The communication ports 15a and 15b are spaced upward from the bottom wall 10c of the cowl box 10 (the bottom wall of the member portion 19). The lower edge of the communication port 15a is located at a predetermined height h1 above the top surface of the bottom wall 10c of the cowl box 10 (the bottom wall of the member portion 19). In other words, a dike portion 15K is formed under the communication port 15a. The dike portion 15K is continuous in the vehicle width direction, and has the predetermined height h1 which is equal to the height from the bottom wall 10c of the cowl box 10 to the lower edge of the communication port 15a.

The inside of the member portion 19 and the inside of the vehicle compartment 17 communicate with each other through the air supplying port 11a. Air inside the member portion 19 is supplied to the inside of the vehicle compartment 17 through the air supplying port 11a. Specifically, the inside of the member portion 19 and the inside of the vehicle compartment 17 communicate with each other through the air supplying port 11a with an air conditioner provided therebetween. The air supplying port 11a is provided in a portion of the rear wall 10b of the cowl box 10, which constitutes the member portion 19. The air supplying port 11a is provided in a location spaced upward from the bottom wall 10c. That is to say, the lower edge of the air supplying port 11a is located at a predetermined height h2 above the top surface of the bottom wall 10c of the cowl box 10 (the bottom wall of the member portion 19). In other words, a dike portion 11K is formed under the air supplying port 11a. The dike portion 11K is continuous in the vehicle width direction, and has the predetermined height h2 which is equal to the height from the bottom wall 10c of the cowl box 10 to the lower edge of the air supplying port 11a. The height h2 of this dike portion 11K is higher than the height h1 of the dike portion 15K of the partition panel 15 (h1<h2). The air supplying port 11a is connected to a duct (not illustrated) of an air conditioner arranged downstream of the air supplying port 11a. This duct is provided with an outside air introducing on-off valve for opening and closing the duct. The outside air introducing on-off valve is not illustrated.

Once the vehicle with the foregoing configuration runs with the outside air introducing on-off valve being opened, air outside the vehicle body 1 (outside air) flows in a direction indicated by arrows shown in FIG. 3. Specifically, the outside air is introduced from the outside air introducing port 14a into a space outside of the member portion 19 inside the cowl box 10, then is introduced into the inside of the member portion 19 through the communication ports 15a and 15b, and finally is supplied from the member portion 19 into the vehicle compartment 17 through the air supplying port 11a.

In the case of the present embodiment, the communication ports 15a, 15b and the air supplying port 11a overlap each other in the vehicle width direction. Specifically, a range of the communication port 15a in the vehicle width direction between the left and right end edges thereof, a range of the communication port 15b in the vehicle width direction between the right and left end edges thereof, and a range of the air supplying port 11a in the vehicle width direction between the right and left end edges thereof overlap each other. This overlapping arrangement allows preventing air from flowing in the vehicle width direction inside the member portion 19 when air is introduced into the inside of the member portion 19 through the communication ports 15a and 15b. Further, this overlapping arrangement prevents the accumulated water such as rainwater from being ruffled inside the member portion 19. Furthermore, this consequence enables to prevent the water from leaking through the air supplying port 11a. Consequently, the present embodiment prevents the water from entering the air conditioner and the vehicle compartment 17 through the air supplying port 11a.

In addition, in the present embodiment, because the communication port 15a and the air supplying port 11a are opposed to each other in the vehicle front-rear direction, air linearly flows from the communication port 15a to the air supplying port 11a. This linear air flow more effectively prevents air from flowing in the vehicle width direction inside the member portion 19. This positional relation between the communication port 15a and the air supplying port 11a more effectively prevents the accumulated water from being ruffled inside the member portion 19. As a consequence, the present embodiment more effectively prevents water from leaking through the air supplying port 11a.

Supposing the cowl employs a structure which causes outside air to be taken in from an outside air intruding port provided in the front end portion of hood ridge members, and thus to be introduced into the inside of the cowl box via the hood ridge members. The outside air thus let in would be heated with the heat generated by the engine installed in the engine room 18 while the outside air is passing each hood ridge member. When the air conditioner is operated in a cooler mode under such condition, the heated outside air would increase a load on the air conditioner, and would lead to a large consumption of electric power. Moreover, this structure would allow dirt, insects and the like to enter the inside of the hood ridge members.

In contrast, according to the present embodiment, the provision of the outside air introducing port 14a in the cowl box 10 produces an effect of effectively preventing the heat from the engine from heating the outside air supplied to the inside of the vehicle chamber 17, in comparison with the above-mentioned structure. For this reason, the present embodiment is capable of controlling the amount of electric power which is consumed by the air conditioner operated in its cooler mode. In addition, the present embodiment is capable of preventing dirt, insects and the like from entering the inside of each hood ridge member.

Furthermore, in the present embodiment, the cowl box 10 includes the cover portion 14d in which the outside air introducing port 14a is formed; the cover portion 14d extends toward the rear of the vehicle from the upper end portion of the front wall 10a, and supports the lowermost edge portion of the front windshield panel 6; the front end portion of the support panel 12 and the rear end portion of the cover portion 14d are spaced from each other; and the opening 10e formed between the front end portion of the support panel 12 and the rear end portion of the cover portion 14d is located frontward of the communication ports 15a and 15b in the vehicle front-rear direction. Because the opening 10e formed between the front end portion of the support panel 12 and the rear end portion of the cover portion 14d is located frontward of the communication ports 15a and 15b in the vehicle front-rear direction, the present embodiment is capable of preventing the falling water from entering the inside of the member portion 19 from the communication ports 15a and 15b, even in a case where water such as rainwater falls into the inside of the cowl box 10 from the opening 10e.

Additionally, in the present embodiment, in the upper wall 10d of the cowl box 10, the support panel 12 is designed to be spaced from the cover portion 14d, and is formed in the cantilever manner. For this reason, even in a case where an external load is applied onto the lower part of the front windshield panel 6 from above, the present embodiment can cause the support panel to produce a reduced reaction force against the external load, and thereby cause the support panel 12 to absorb impact energy efficiently.

On the other hand, in the present embodiment, because the member portion 19 is formed by including the partition panel 15, the rigidity of the cowl box 10 is reinforced, and therefore the sufficient rigidity in the front part of the vehicle body can be secured. Furthermore, in the present embodiment, the partition panel 15 is suspended between the dash side panels 8 as the right and left vehicle body side panels included in the vehicle body 1, and is fixed to the right and left dash side panels 8. Consequently, the present embodiment reinforces the cowl box more strongly, so that the rigidity of the front part of the vehicle body can be enhanced. This makes the present embodiment capable of preventing abnormal noise such as chattering noise from occurring in the dash panel 5. Moreover, as described above, because the partition panel 15 is suspended between and fixed to the dash side panels 8 as the right and left vehicle body side panels included in the vehicle body 1, the present embodiment can enhance the cowl's capability of insulating the vehicle compartment 17 from noise including engine noise, which would otherwise enter the vehicle compartment 17 from the front more.

The preferred embodiment described herein is illustrative and not restrictive, and the invention may be practiced or embodied in other ways without departing from the spirit or essential character thereof. For example, the cross-section of the partition panel 15 may be shaped in any other form, for instance, in the form of a flat surface instead of the alphabet L. As well, the cross-section of the member portion 19 may be shaped like a triangle. The scope of the invention being indicated by the claims, and all variations which come within the meaning of claims are intended to be embraced herein.

What is claimed is:

1. A cowl structure of a vehicle, comprising:
   a cowl box provided to a vehicle body and extended in a vehicle width direction, the cowl box including: a front wall; a rear wall opposed to the front wall in a vehicle front-rear direction; a bottom wall connecting the front wall with the rear wall; and a support panel which extends frontward from an upper end portion of the rear wall and which supports a lower edge portion of a front windshield panel;
   a partition panel joined to both the rear wall and the bottom wall inside the cowl box, the partition panel including, together with the rear wall and the bottom wall, a hollow member portion extending in the vehicle width direction;
   an outside air introducing port provided in the cowl box, for introducing air outside the vehicle body into the cowl box outside of the member portion;
   a communication port provided in the partition panel, for allowing an inside and outside of the member portion to communicate with each other inside the cowl box; and
   an air supplying port provided in the rear wall at a location spaced upward from the bottom wall, the air supplying port allowing the inside of the member portion and an inside of a vehicle compartment to communicate with each other,
   wherein the communication port and the air supplying port overlap each other in the vehicle width direction,
   wherein the cowl box further includes a cover portion in which the outside air introducing port is formed,
   wherein the cover portion extends rearward from an upper end of the front wall, and supports a lowermost edge portion of the front windshield panel,
   wherein a front end portion of the support panel and a rear end portion of the cover portion are spaced from each other, and
   wherein an opening formed between the front end portion of the support panel and the rear end portion of the cover portion is located forward of the communication port in the vehicle front-rear direction.

2. The cowl structure of a vehicle according to claim 1, wherein the communication port and the air supplying port are opposed to each other in the vehicle front-rear direction.

3. The cowl structure of a vehicle according to claim 1, wherein the partition panel is extended between right and left vehicle body side panels of the vehicle body, and is fixed to the right and left vehicle body side panels.

* * * * *